United States Patent [19]

Schmid

[11] 3,733,642
[45] May 22, 1973

[54] HINGE COUPLING FOR A WINDSHIELD WIPER ASSEMBLY

[75] Inventor: Eckhardt Schmid, Guglingen/Wurttemberg, Germany

[73] Assignee: SWF-Spezialfabrik Fuer Autozubehor Gustav Rau GmbH, Bietigheim, Germany

[22] Filed: Sept. 20, 1971

[21] Appl. No.: 182,487

[30] Foreign Application Priority Data

Sept. 29, 1970 Germany.....................P 70 35 947.6

[52] U.S. Cl..............................................15/250.32
[51] Int. Cl.................................................B60s 1/40
[58] Field of Search......................15/250.31, 250.32, 15/250.36, 250.42

[56] References Cited

UNITED STATES PATENTS

| 3,179,969 | 4/1965 | Glynn................................15/250.32 |
| 3,408,679 | 11/1968 | Deutscher et al. ................15/250.32 |
| 3,585,672 | 6/1971 | Habert..............................15/250.32 |

*Primary Examiner*—Peter Feldman
*Attorney*—Toren and McGeady

[57] ABSTRACT

In connecting a windshield wiper arm to the yoke of a wiper blade, a monolithic coupling part formed of a plastic material is used. The wiper arm is pivotally connected to the coupling part and, in turn, the coupling part is disposed in locked engagement with the yoke. The coupling part is formed of a plurality of spaced wall sections which form recesses into which a U-shaped part of the wiper arm fits. A bearing pin fits through a continuous bore extending through the wall sections of the coupling part and through the U-shaped part of the wiper arm to afford the pivotal connection between the two. The portion of the yoke connected to the coupling part fits into slots formed on the outer surface of the coupling part and retains the bearing pin within the continuous bore.

9 Claims, 5 Drawing Figures

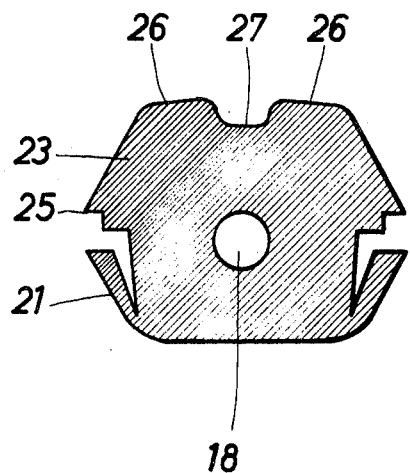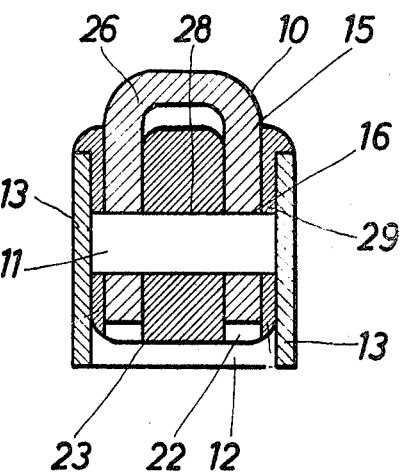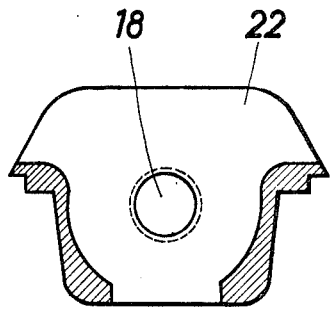

HINGE COUPLING FOR A WINDSHIELD WIPER ASSEMBLY

SUMMARY OF THE INVENTION

The present invention is directed to a hinge coupling for a windshield wiper assembly for vehicles, and especially for automotive vehicles, and, more particularly, it concerns a monolithic coupling part formed of a plastic material for interconnecting a wiper arm to the yoke of a windshield wiper blade.

In the past, hinge couplings between a wiper arm and the yoke of a windshield wiper blade have been effected by means of rivited couplings. In such an arrangement, the wiper arm is provided with a U-shaped section and is nested within the yoke and a transverse bore extends through both parts of the coupling with a rivet within the bore acting as a bearing pin. As a result, the yoke was permanently but rotatably connected to the wiper arm. However, a permanent connection is no longer useable, since a speedy replacement of the wiper blade on the wiper arm is required.

Therefore, it is the primary object of the present invention to provide a hinge coupling between the windshield wiper arm and the yoke of a windshield wiper blade which permits speedy replacement of the wiper blade and also affords effective and relatively noiseless operation of the parts in the windshield wiper assembly.

In accordance with the present invention, a hinge coupling for a windshield wiper assembly for vehicles, and especially for automotive vehicles, involves the use of a monolithic coupling part formed of plastic material for interconnecting a wiper arm to the yoke of a wiper blade. The coupling part is formed to provide recesses into which a U-shaped part of the wiper arm fits and is secured by a bearing pin which extends through the coupling part and the U-shaped part of the wiper arm. Further, the portion of the yoke to which the coupling part is connected has a channel-shape form into which the coupling member is slid and locked in position by means of locking elements on the coupling part. The yoke includes lateral flanges which embrace the sides of the coupling part and retain the bearing pin in position so that it cannot be displaced in its axial direction.

In one arrangement, the coupling part is formed of a plurality of spaced wall sections with the spaces between adjacent wall sections forming recesses into which the U-shaped part of the wiper arm fits. Further, the yoke of the wiper blade includes a pair of spaced lateral flanges which fit into slots formed on the exterior sides of the coupling part. The outer wall sections forming the coupling part contain the external slots for the flanges of the yoke and are separated from the wiper arm within the recesses by the outer wall sections themselves. Accordingly, the yoke and the wiper arm are pivoted without any mutual contact at the hinge point which results in considerable noise reduction.

Additionally, an inner or central wall section separates the recesses within the coupling part and on its side directed toward the wiper arm provides a pair of spaced shoulders which limit the pivotal movement between the coupling part and the wiper arm.

The bearing pin which affords the pivoting action extends for the full dimension of the coupling part between its outer sides and the pin is secured within the coupling part by the flanges of the yoke which embrace the sides of the coupling part. When assembled together, the bearing pin passes through the wall sections of the coupling part and through its recesses in which it also passes through the U-shaped part of the wiper arm.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 3 is a cross sectional view through the coupling part taken along the axis of the bearing pin;

FIG. 4 is a cross sectional view through the coupling part transverse to the section shown in FIG. 3; and FIG. 5 is a view, partly in section, through the portion of the coupling part into which the wiper arm fits.

DETAILED DESCRIPTION OF THE INVENTION

Figure 1:
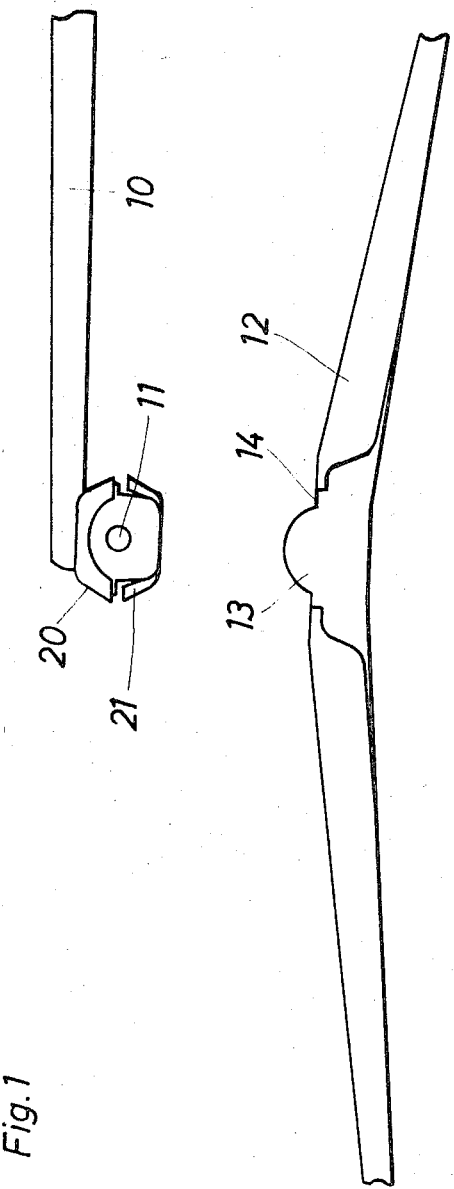
FIG. 1 is a side view of a wiper arm connected to a coupling member formed in accordance with the invention and positioned adjacent the yoke of a wiper blade into which the coupling part is engageable.
Figure 2:
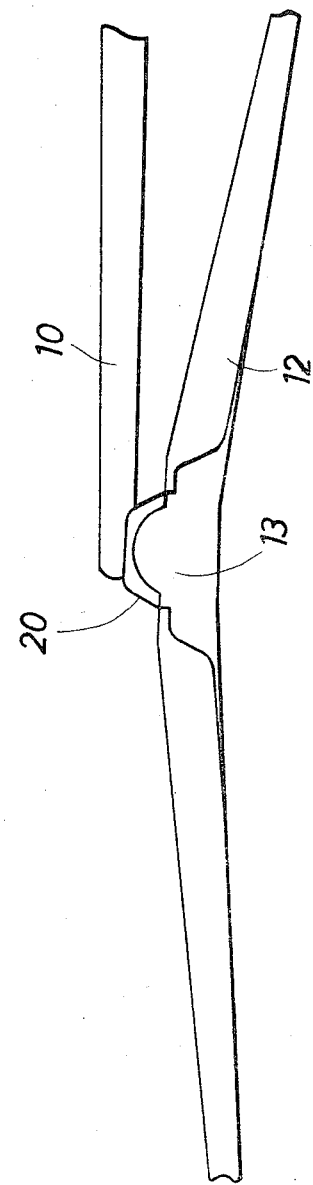
FIG. 2 is a side view of the arrangement shown in FIG. 1 with the coupling part engaged within the yoke.

In FIG. 1, the end of a wiper arm 10 of a windshield wiper assembly is pivotally connected by a bearing pin 11 into a monolithic coupling part or member 20 formed of a plastic material. To effect the interengagement, the end of the wiper arm 10 is provided with a U-shaped connecting part which fits into the coupling part and a continuous transverse bore extends through the coupling part and the legs of the U-shaped part of the wiper arm and receives the bearing pin 11 which hinges the wiper arm and coupling part together. A yoke 12 has a U-shaped configuration which forms a channel in the region of its web into which the coupling part is fitted. As indicated in FIG. 2, in the assembled position, the wiper arm 10 and coupling part 20 are slid into the channel 14 of the yoke 12 and the coupling part is retained or locked to the yoke by means of the locking elements 21, note FIG. 1. In FIG. 1 it can be noted that the bearing pin is positioned within the sides of the coupling part which abuts the flanges 13 of the yoke when the various parts are assembled together. As a result, the flanges 13 on each side of the yoke retain the bearing pin within the coupling part so that it cannot be axially displaced. As shown, the bearing pin can be cylindrical and does not need to be riveted or deformed at its ends to hold it in position.

In FIG. 3 the wiper arm 10, the yoke 12, and the coupling part 20 are shown assembled together.

The coupling part 20 is formed of a plurality of wall sections including a central wall section 23 and a pair of side wall sections 29 each spaced laterally from the central wall section. The spaced apart arrangement of the wall sections provides a pair of recesses 22, each located between one of the side wall sections and the central wall section. The portion of the wiper arm 10 connected to the coupling part has a U-shaped configuration 15 so that the legs of the U-shaped configuration extend into the recesses 22 formed in the coupling part and fit closely within the recesses. A transverse bore 28 extends through the central wall section 22 and through each of the side wall sections 29. The outwardly facing surfaces of the side wall sections are shaped to provide external slots which receive the lateral flanges 13 of the yoke 12.

As indicated above, the bearing pin 11 extends through the coupling part 20 from one side wall section 29 to the other, passing through the recesses 22 and through the central wall section 23. Further, with the U-shaped part 15 of the wiper arm positioned within the recesses 22, the pin also passes through the U-shaped part. As can be seen in FIG. 3, the pin extends between the outer surfaces of the side wall sections 29 and abuts against the flanges 13 of the yoke so that the flanges prevent any axial displacement of the bearing pin. The configuration of the recess 22 for the correspondingly shaped part of the wiper arm 10 is shown in FIG. 5.

In FIG. 4 the upper surface of the central wall section 23, that is the edge facing the wiper arm, is divided by a transverse groove 27 into a pair of spaced stops 26. The stops 26 are provided to limit the pivotal movement between the wiper arm 10 and the coupling part 20. Further, on each of the ends of the central wall section 23 a stop 25 is provided which faces the yoke and, as mentioned previously, a locking element 21 extends outwardly from each of the ends of the central wall section 23 for engagement with the channel 14 of the yoke. When the yoke and the coupling part are slid into engagement with one another, the stops 25 and the locking elements 21 provide a rigid connection between the two.

While a specific embodiment of the invention has been shown and described in detail to illustrate the application of the inventive principles, it will be understood that the invention may be embodied otherwise without departing from such principles.

What is claimed is:

1. A hinge coupling for a windshield wiper on a vehicle, especially for use in automotive vehicles, for connecting the yoke of a windshield wiper blade to a wiper arm, comprising a monolithic coupling part formed of a plastic material, said coupling part comprising a central wall section and a side wall section positioned on each side of and spaced laterally from said central wall section, each said side wall section having an inwardly facing surface directed toward said central wall section and an outwardly facing surface directed away from said central wall section, the side surfaces of said central wall section each combine with one of the inwardly facing surfaces of the adjacent said side wall sections to form a pair of recesses for receiving the wiper arm, the outwardly directed surfaces of said side walls are arranged to be contacted by the yoke, said central wall section and said side wall sections each having a bore therethrough and said bores disposed in axial alignment, and a bearing pin positioned within and extending through said bores and through the recesses between said central wall sections and said side wall sections for pivotally securing the wiper arm to said coupling part.

2. A hinge coupling, as set forth in claim 1, wherein the edge of said central wall section arranged to face the wiper arm has a pair of spaced shoulders each disposed on an opposite side of the axis of the bore through said central wall section, and said shoulders are arranged to limit the pivotal movement of the coupling part with respect to the wiper arm.

3. A hinge coupling, as set forth in claim 1, wherein said bearing pin is cylindrical and has a length equal to the overall dimension between the outwardly facing surfaces of said side wall sections.

4. A hinge coupling, as set forth in claim 1, wherein the outwardly facing surfaces of said side wall sections are shaped to provide slots for receiving the yoke.

5. A hinge coupling, as set forth in claim 1, wherein an outwardly extending locking element is formed in each end surface of said coupling part which extends transversely of the recesses between said central wall section and said side walls, said locking elements arranged to lock said coupling part to the yoke.

6. A hinge coupling assembly for a windshield wiper for use in vehicles, and especially for automotive vehicles, comprising a wiper blade arm, a yoke for a windshield wiper blade, a monolithic coupling part formed of a plastic material, said coupling part comprising a central wall section and a side wall section positioned on each side of and spaced laterally from said central wall section, each said side wall section having an inwardly facing surface directed toward said central wall section and an outwardly facing surface directed away from said central wall section, said central wall section combining with the inwardly facing surfaces of the adjacent said side wall sections to form a recess on each side of said central wall section, said central wall section and said side wall sections each having a bore therethrough and said bores disposed in axial alignment, said wiper blade arm comprises a U-shaped connector part with each leg of said connector part fitted into one of said recesses in said coupling part, and each leg of said connector part having a bore therethrough in alignment with the bore through said central wall section and said side wall sections of said coupling part, a bearing pin positioned within and extending through said bores in said central wall section, said side wall sections and said legs of said U-shaped connector part of said wiper arm for pivotally securing said wiper arm to said coupling part, and said yoke having a pair of spaced flanges each in engagement with one of the outwardly facing surfaces of said side wall sections.

7. A hinge coupling assembly, as set forth in claim 6, wherein the outwardly facing surfaces of said side wall sections are shaped to provide slots, and the flanges of said yoke fit into said slots in engagement with the sides of said coupling part.

8. A hinge coupling assembly, as set forth in claim 6, wherein said bearing pin is cylindrical and has a length equal to the overall dimension between the outwardly facing surfaces of said side wall sections.

9. A hinge coupling assembly, as set forth in claim 7, wherein the part of said yoke having said flanges in engagement with said coupling part has a U-shaped configuration and forms a channel, an outwardly extending locking element being formed in each of the end surfaces of said coupling part which extend transversely of the recesses between said central wall section and said side wall sections, and said locking elements arranged to lock said coupling part to said yoke.

* * * * *